United States Patent [19]

Ohki et al.

[11] Patent Number: 5,115,777

[45] Date of Patent: May 26, 1992

[54] METHOD AND APPARATUS FOR DRIVING AN AUXILIARY DEVICE OF AN INTERNAL COMBUSTION ENGINE

[75] Inventors: Yoshinori Ohki, Tokyo; Hiroshi Mochizuki, Kanagawa, both of Japan

[73] Assignee: Iida Denki Kogyo Co., Ltd., Tokyo, Japan

[21] Appl. No.: 465,151

[22] PCT Filed: Jun. 19, 1989

[86] PCT No.: PCT/JP89/00609

§ 371 Date: Feb. 22, 1990

§ 102(e) Date: Feb. 22, 1990

[87] PCT Pub. No.: WO89/12740

PCT Pub. Date: Dec. 28, 1989

[30] Foreign Application Priority Data

Jun. 22, 1988 [JP] Japan ............... 63-154200

[51] Int. Cl.$^5$ ............... F02P 11/02; F02D 41/22
[52] U.S. Cl. ............... 123/333; 123/198 D; 123/335
[58] Field of Search ............... 123/333, 335, 352, 353, 123/354, 198 D

[56] References Cited

U.S. PATENT DOCUMENTS

| | | | |
|---|---|---|---|
| 3,601,103 | 8/1971 | Swiden | 123/335 |
| 3,884,203 | 5/1975 | Cliffgard | 123/335 |
| 4,058,106 | 11/1977 | Drews et al. | 123/333 |
| 4,163,431 | 8/1979 | Wilkinson | 123/335 |
| 4,311,124 | 1/1982 | Schulzke | 123/333 |
| 4,462,356 | 7/1984 | Hirt | 123/335 |
| 4,977,877 | 11/1990 | Dykstra | 123/335 |
| 5,009,208 | 4/1991 | Fiorenza, II. | 123/335 |

FOREIGN PATENT DOCUMENTS

| | | |
|---|---|---|
| 48-57025 | 8/1973 | Japan. |
| 51-327 | 6/1976 | Japan. |
| 54-103925 | 6/1979 | Japan. |
| 58-79670 | 5/1983 | Japan. |
| 58-98662 | 6/1983 | Japan. |
| 99675 | 5/1987 | Japan. |
| 9680 | 1/1988 | Japan. |

Primary Examiner—Tony M. Argenbright
Attorney, Agent, or Firm—Wegner, Cantor, Mueller & Player

[57] ABSTRACT

A method and an apparatus for driving an auxiliary device of an internal combustion engine according to the present invention is directed to preventing an over revolution of an engine by detecting a speed of the revolution of the engine, regardless the magnitude of an induced voltage of a primary winding of an ignition device. To accomplish the object, ① a time width of one cycle at a rated speed N1 of an engine is set as a reference time T1, ② a reference signal V1 is produced for a time T1−T2 starting from a point t2 which is a fall point of a delay time T2, which is started from a rise point t0 of a primary current i of an ignition device and is shorter than the reference time T1, ③ a search signal V2 is produced from the rise point t0, and when the reference signal V1 of a preceding cycle and the search signal V2 of a succeeding cycle are produced simultaneously, a drive signal V4 is produced for a time that the reference signal V1 and the search signal V2 are superposed on each other, and ④ said drive signal V4 is applied to drive an auxiliary device 6 mounted to an internal combustion engine.

8 Claims, 4 Drawing Sheets

1

METHOD AND APPARATUS FOR DRIVING AN AUXILIARY DEVICE OF AN INTERNAL COMBUSTION ENGINE

TECHNICAL FIELD

The present invention relates to a method and an apparatus for driving an auxiliary device mounted on an internal combustion engine, which is driven when the speed of revolution of an internal combustion engine exceeds a set speed.

TECHNICAL BACKGROUND OF THE INVENTION

To insure safe operation of an internal combustion engine, a control means, which detects the over-revolution of an engine and turns on an auxiliary device which prevents the over-revolution, has widely been used.

The control means is generally arranged so that when an engine over-revs, it delays or interrupts ignition and slows down the speed of revolution.

This control means is arranged such that it detects an output of an ignition coil of an ignition device or it detects an output of a signal coil for setting a ignition time, and when a speed of revolution of the internal combustion engine exceeds a set speed, it controls the primary current and delays or interrupts an ignition time and controls the speed.

The circuit of this control means includes a part of a circuit of an ignition device, so that an application of the control means to devices is not easy and is limited. Besides, when a speed of revolution is controlled by putting out the fire, it is difficult to smoothly light the fire again, so that a hysteresis of a speed control characteristic becomes higher resulting in irregularity of the revolution, and the speed of the revolution undesireably decreases, causing so called hunting.

To resolve these problems, new means have been introduced such as in Japanese Patent Provisional Publication No. 62-99675 and 63-9680.

Thses new means are arranged so that a speed control device is organized independently and is mounted to an ignition device, and the means detects the magnitude of the voltage induced in a primary winding of an ignition coil, which rises in proportion to the speed of revolution of an engine. When the voltage induced in the primary winding reaches a set voltage, the means detects that the speed of revolution has reached a set speed and delays ignition time of the ignition device to control the speed.

The speed control means mentioned above is organized totally separate from an ignition device, so that it can easily be mounted on the ignition device. Further, it is arranged to function only when the speed of revoluti-uon of an engine is higher than a set speed, so that the engine revolves smoothly. However, the basic function of the speed control means is a so-called wave form detect charge-discharge voltage type analog control formula which is arranged such that a detected wave form is charged to a condenser and a discharge voltage is applied for its function, so that a controlled revolution becomes irregular because of a magnetic variation (wave form variation) and, thus theoretically, its function is unstabilized. Besides, a threshold point has to be set individually, depending an a dimension of an air gap between a flywheel and an ignition coil, so that installing the control means to an internal combustion engine requires a highly trained technician. Further, a lot of work such as setting the set point has to be done after installing the means to the engine, so that the installation procedure has become rather complicated work. Moreover, different types of control means are required, depending on a type and size of the engine, so that small numbers of many different types of control means have prepared for users, resulting in a higher price of the control means.

An object of the present invention therefore is to provide a method and a means, which stabilizes a control action by detecting the speed of revolution of an engine regardless of a magnitude of the voltage of a primary winding of an ignition device.

Another object of the present invention is to provide a method and a means which sends a drive signal which is previously set at a certain point regardless of the size of an air gap.

Another object of the present invention is to provide a means which can be mounted on any different type and size of an internal combustion engine.

DETAILED DESCRIPTION OF THE INVENTION

Figure 1:
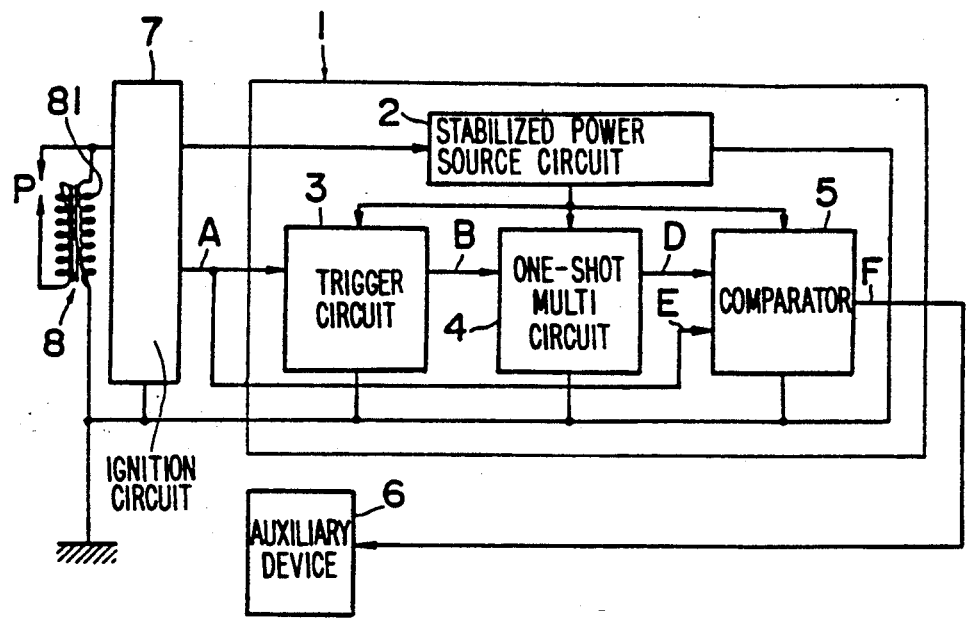
FIG. 1 is a block diagram showing a basic circuit of the present invention.
Figure 2:
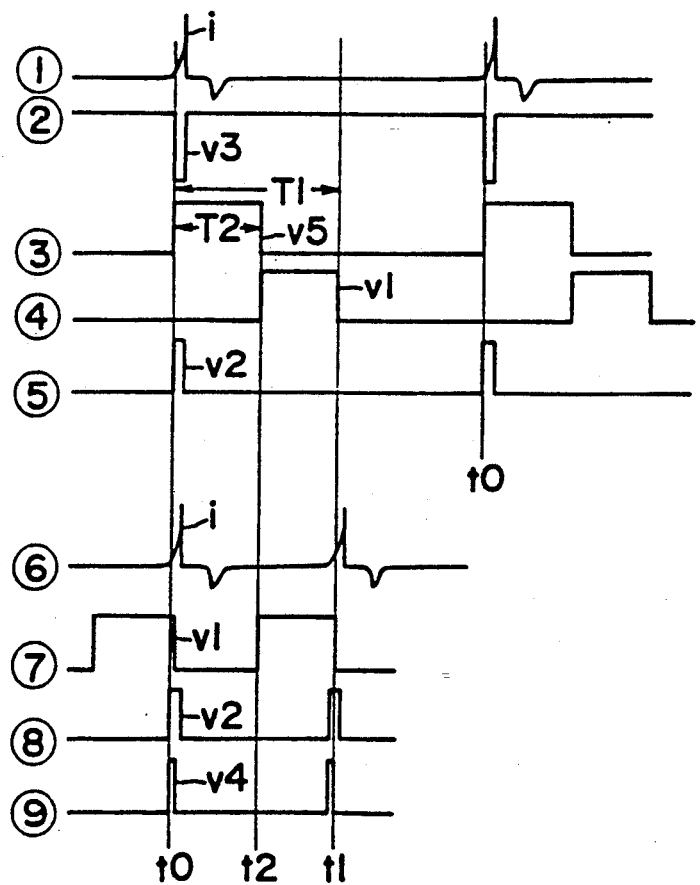
FIG. 2 is a diagram showing a timing chart of an operation of the present invention.

The present invention will be described below referring to FIGS. 1 and 2.

To accomplish the objects, according to the present invention, ① the time width of one cycle at a rated speed N1 set for the engine is set as a reference time T1, ② a reference signal V1 is produced during a time T1−T2, said time T2 is shorter than a time T1 and T2 is raised with the time T1 at a rise point t0 of a primary current i of a ignition device, ③ a drive signal V4 is produced during a time in which both a reference signal V1 of a preceding cycle and a search signal V2 of a succeeding cycle are produced and superposed on each other, ④ the produced drive signal V4 is used to drive an auxiliary device mounted on the internal combustion device.

To perform the method described above, a means according to the present invention comprises: ① a trigger circuit 3, which produces a trigger signal V3 when a primary current i of an ignition device rises; ② an one-shot multivibrator circuit 4, which produces a reference signal V1 upon receiving a trigger signal V3 produced by the trigger circuit; ③ a comparator 5, which receives the reference signal V1 and a search signal V2 produced when a primary current i is raised, and when both signals Vi, V2 are superposed on each other, said comparator 5 produces a drive signal V4 to drive an auxiliary device 6, and ④ a stabilized power source circuit 2, which charges a reverse voltage produced by an ignition device to drive the trigger circuit 3, one-shot multivibrator circuit 4 and a comparator 5.

The trigger circuit 3 is composed of a transistor 13 and a resistance R8, said transistor 13 and said resistance R8 are connected in series, said resistance R8 is connected to a positive electrode of a power source 2, and a connected point of the resistance R8 and the transistor 13 is an output terminal of a trigger signal V3. The transistor 13 connects a base via a resistance on a circuit of a primary current.

The one-shot multivibrator circuit 4 comprises two one-shot multivibrator circuits, and a reference signal V1 is produced by a second one-shot multivibrator circuit affected by a fall point t2 of a preliminary signal V5 produced by a first one-shot multivibrator circuit.

The stabilized power source 2 comprises a condenser C9 which charges a reverse voltage through a diode 23 and zener diode 24, a condenser C10 for a power source which charges the power source of the condenser C9 by reversing an electrode through a diode 22 and a resistance 24, a zener diode 25 connected in a reverse direction in parallel with the condenser C10 via a resistance 25 for dropping a voltage, an output terminal of a positive side of a first transistor 18 being connected to a cathode of the zener diode 25, an output terminal of a negative side of a second transister 19 being connected to a base of the first transister 18, and a third transistor 26 for a temperature compensation connected to a base of the second transister 19. Said first, second and third transisters 18, 19, 26 having the same rating.

As an auxiliary device 6 driven by an apparatus according to the present invention, devices such as an over-revolution preventing device—which is arranged so that a breaking of a switch for controlling a primary current of a ignition device is terminated for a time width that a control signal V6 is being produced—and a plunger—which brings a control device of an internal combustion engine such as a carburetor, a clutch and a brake to a stop position—are concerned.

A function of the present invention is described below.

A reference signal V1 is produced for a time width of one cycle while an engine is being revolved at a rated speed and a rise point t2 and a fall point t1 are set based on a rise point t0 of a primary current i, so that a time beteen the rise point t0 of the primary current i and the fall point t1 of the reference signal V1 of any one cycle becomes equivalent to a reference time T1, which is a time of one cycle. Therefore, when a speed of an engine is below a rated speed N1, a time of one cycle is longer than the reference time T1, so that the fall point t1 of the reference signal V1 of a preceding cycle positions prior to the rise point t0 of the primary current i of a succeeding cycle, resulting that the reference siganl V1 of the preceding cycle does not superpose with a search signal V2, thus a drive signal V4 is not produced and an auxiliary device is not turned on.

As a speed of revolution N of the engine is accelerated, a time of a cycle shortens, so that the fall point t1 of the reference signal V1 of the preceding cycle and the rise point t0 of the search signal V2 of the succeeding cycle come closer. And when the speed N reaches to the rated speed N1, the fall point t1 of the reference signal V1 of the preceding cycle and the rise point t0 of the search signal V2 of the succeeding signal are superposed on each other, so that the reference signal V1 and the search signal V2 are taken to a comparator 5 and that the comparator 5 produces a drive signal V4 which drives an auxiliary device 6.

When the speed N of the engine drops below the rated speed N1, the point t1 of the preceding cycle returns to the point prior to the point t0 of the succeeding cycle, so that the drive signal V4 produced from the comparator 5 is terminated and the device returns to the orignal condition.

The trigger circuit 3 is arranged such that by connecting a base of a transistor 13, which is a detective terminal and is connected to a resistance, to a point A of a path of a primary current i (as shown in ⑥ of FIG. 2), the transistor 13 is conducted at a same time the primary current i of an ignition circuit 7 rises. As the transistor 13 is conducted, a trigger signal V3 of a negative pulse (as shown in ② of FIG. 2) is produced at point B with the similar point t0 that the primary current rises.

An one-shot multivibrator circuit 4, which is activated by the trigger signal V3, produces a reference signal V1 which is a time width of T1–T2 (as shown in ④ of FIG. 2), an output at point D. The reference signal V1 is produced after a certain time (T1−T2) starting from the rise point t0 of the primary current of the same cycle to prevent the reference signal V1 and the search signal V2 superposing each other.

When the one-shot multivibrator circuit 4 is composed of preceding and succeeding one-shot multivibrator circuits, the preceding one-shot multivibrator circuit is activated by a trigger signal V3 for a certain time T2, and the succeeding one-shot multivibrator circuit is activated by a fall of a preliminary signal V5 (as shown in ③ of FIG. 2), which is an output signal of the preceding one-shot multivibrator, and produces a reference signal V1. As described above, the succeeding one-shot multivibrator circuit, which produces the reference signal V1, is arranged to be activated by the preliminary signal V5 produced from the preceding one-shot multivibrator circuit, so that the succeeding one-shot multivibrator circuit can be accurately activated starting from the point t2 affected by the fall of the preliminary signal V5, and that the reference time T1 can be accurately arranged.

The comparator 5, when the reference signal V1 and the search signal V2 produced from the one-shot multivibrator circuit 4 are superposed, that is when the speed of revolution of an engine exceeds the rated speed N1 and a time of a cycle of the primary current shortens (as shown in ⑥, ⑦, ⑧ of FIG. 2), the fall point t1 of the preceding cycle positions behind the point t0 of the succeeding cycle, and a driving signal V4 (as shown in ⑨ of FIG. 2) is produced at point F.

The stabilized power source 2 is arranged such that a pump circuit thereof comprises a condenser C9 and a condenser C10, a reverse voltage of a primary winding 81 is charged to the condenser C9, the reverse voltage of the condenser C9 is again reversed to an opposite electrode and is charged to the condenser C10 via a diode 22, and the power source charged in the condenser C10 is utilized as a source of the trigger circuit 3, one-shot multivibrator circuit 4 and the comparator 5. The trigger circuit 3, the one-shot multivibrator circuit 4 and the comparator 5 are arranged only to detect a potential difference and to produce a signal of the difference, so that they require only a small amount of power source. For that reason, even if a reverse voltage is affected by an unstable condition of an ignition device and an electric potential thereof is unstabilized, they can always receive an enough of a power source. That is, by reversing the reverse voltage charged in the condenser C9 and charging the reversed voltage (positive viltage)

to the condenser C10 preparing a reference voltage, an easiness of a drive and a control of an integrated circuit, which is comprised in the one-shot multivibrator circuit 4 and the comparator, is improved. However, since the reference voltage, the voltage charged in the condenser C10, is utilized as the power source, a stability thereof against an irregularity of the reverse voltage occuring in an ignition device and against an irregularity of a voltage occuring as an apparatus 1 moves and stops is not satisfied. Therefore, a stabilized primary power source voltage is obtained by normally running a current about ten times larger than a load current to a zener diode 25 through a resistance R25. By producing the primary power source voltage through a first transistor 18 whose base is controlled by a second transistor 19, a remarkably stabilized power source voltage can be obtained. A third transistor 26 for a temperature compensation is connected to a base of the second transistor 19, and all of the transistors 18, 19, 26 are rated the same, so that an irregularity of the power source voltage that could occur by an influence of a temperature change is successfully prevented.

As described above, a method and an apparatus according to the present invention is arranged such that it is not activated by detecting a magnitude of a primary current induced in an ignition device but is activated by detecting a rise of a primary current i, so that an operation thereof is not affected by a difference of a rate or a kind of a device.

Further, since a difference in magnitude of a primary current or a primary voltage does not affect the operation of the present invention, even when there is an air gap between an apparatus according to the present invention and a ignition device of an engine caused by a setting, the speed of revolution of the engine can be accurately detected by only setting the apparatus 1 without being affected by the air gap.

Moreover, according to the present invention, a primary current i of an ignition device itself is not entered but a rise current of the primary current is entered, so that an impedance of an apparatus according to the present invention can be kept considerably high and that a consumption of a power source can be minimized, as a result, a burden is seldom affected to the ignition device.

Figure 3:
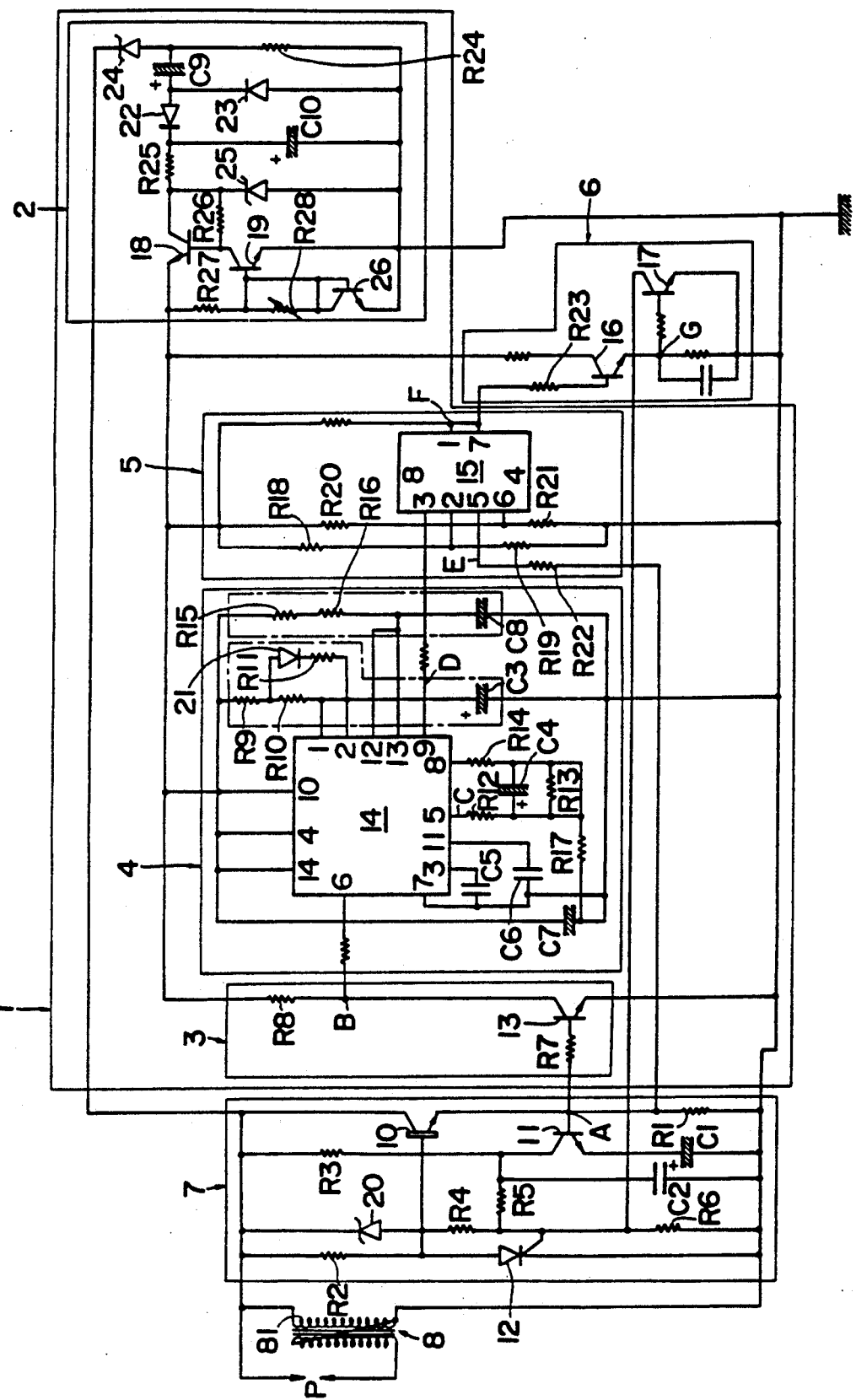
FIG. 3 is a preferred electric circuit according to the present invention showing an over-revolution preventing device as an auxiliary device.

Before describing a preferred embodiment of the present invention shown in FIG. 3, a formation and a performance of an ignition circuit 7 will be briefly explained below.

The ignition circuit 7 comprises, in parallel with a primary winding 81 of a ignition coil 8 whose plug P is connected to a second winding, a series circuit of a transistor 10 which controls a circular and a breaking of a primary current and a resistance R1 with a low resistance value, a series circuit of a resistance R2 with a high resistance value and a thyristor 12, and a series circuit of a resistance R3 with a high resistance value and a transistor 11 and a condensor C1. A base of the transistor 10 is connected to an anode of a thyristor 12 to which the resistance R2 is connected, a base of the transistor 11 is connected to an emitter of the transistor 10, a collector of the transistor 11 is connected to a gate of the thyristor 12 via a resistance R5 for a stabilization. A reversed zener diode 20, a resistance R4 and a condensor C2 are for those that protect a condensor 10 from a transient voltage at a time of an ignition and that prevent a glow. A resistance R6 is applied to stabilize a gate of the thyristor 12.

The ignition circuit 7 is arranged so that some of a reverse voltage occuring prior to an induction of a forward direction voltage of a primary winding 81 is charged to a condensor C1, and the charged voltage triggers the transistor 11. When a forward direction voltage is induced in the primary winding 81, the transistor 10 is turned on, thereby the transistor 11 is turned on which has been triggered by the transistor 10, then a voltage is charged in a negative direction to the condensor C1 as shown in the chart.

When the primary current i has begun to reduce its volume after reaching the maximum volume, a positive electrode of the condensor C1—an electrode of an emitter of the transistor 10 against a base of the transistor 11—drops, so that the transistor 11 is turned off and the thyrister 12 is turned on. Since the thyrister 12 is turned on, the transistor 10 is turned off, thereby the primary current i is turned off and the plug P sparks.

A stabilized power source circuit 2 is arranged such that a reverse voltage produced in an ignition circuit 7 is charged to a condensor C9, and that the reverse voltage charged to the condensor C9 is charged to a condensor C10 via diode 22 reversing its electrode to a reference voltage. The reference voltage charged to the condensor C10 is continued to discharge through a resistance R25 and a zener diode 25, so that it turns to be a stabilized primary power source voltage and it is supplied as a output power source voltage through a first transistor 18. The output power source voltage supplied from the first transistor 18 can be kept highly stable, since the first transistor 18 is base controlled by the second transistor 19 whose temperature is compensated by the third transistor 26. That is, when the reverse voltage of the ignition circuit 7 is unstable, or when the first power source voltage is slightly unstabilized affected by a switching of the apparatus 1, an output current of the first transistor 18 is increased and decreased. However, the increase and decrease fluctuation of the output current of the first transistor 18 increases and decreases an amplification rate of the second transistor 19 as it becomes a fluctuation of a base current of the second transistor 19, so that the first transistor 18 reverses the amplification rate and eliminates the fluctuation of the output current and constantly keeps the output power source voltage stable at a certain volume. A trigger circuit 3 is arranged such that when a primary current i enters into an ignition circuit 7, a transistor 13 catches its rise through a controlled resistance R7 and is thereby turned on. Since the transistor 13 is turned on, an electrode of a point B, a collector, is dropped to the ground and a trigger signal V3, a negative signal, is produced.

The one-shot multivibrator circuit 4 is mainly composed of an integrated circuit 14, a timer IC. When a negative signal is entered into a pin 6, from a fall point of this signal, a preliminary signal V5 which has a certain time width and is set by a formula of $1.1 \times C3 \times Rx$ (Rx is a total resistance of R9, R10, R11 and a diode 21) is entered into a pin 5, and the preliminary signal V5, by differentiating by a condensor C4, is applied to a pin 8, a second input terminal of the integrated circuit 14. When the preliminary signal V5 is entered into the pin 8, a reference signal V1, which is a signal having a certain time width and is set by a formula of $1.1 \times C8 \times (R15 + R16)$, is produced from a pin 9. The condensers C5, C6 are comprised to prevent a noise of the integrated circuit 14, and the condensor C7 and the resistance R17 are comprised for a stabilization.

According to this one-shot multivibrator circuit 4, a setting of a time width of the preliminary signal V5 can be done easily, since it is only required that a rise point t2 of the reference signal V1 should be delayed for a time T2 from a rise point t0 of the primary current i. A time width of the reference signal V1 should be arranged equal to the reference time T1, since a time width between the point t0 to its fall point t1 makes up a speed of the rated speed N1. This arrangement can be done by setting a resistance value of the resistance R15.

The comparator 5 is composed of an integraged circuit 15, a dual comparator, and pins 1, 7, thereof, output terminals, are open collectors and are only for an input. The reference signal V1 is entered into a pin 3, and a power source voltage from the stabilized power source circuit 2 is divided by resistances R18 and R19 and is entered into a pin 2. Both of the pins 2, 3 are input terminals. Point A of the ignition circuit 7 is connected to a pin 5 via a resistance R22, and a search signal V2, a rise signal of the primary current, is entered thereto. A power source voltage from the stabilized power source circuit 2 is divided by resistances R20 and R21 and is entered into a pin 6. Both of the pins 5, 6 are also input terminals. When an electrode of the pin 3 is lower than that of the pin 2, a pin 1 is for an input, and when the electrode of the pin 3 is higher, the input of the pin 1 is terminated. When a electrode of the pin 5 is lower than that of the pin 6, a pin 7 is for an input, and when the electrode of the pin 5 is higher, the input of the pin 7 is terminated. Therefore, when a speed N of an engine is below a rated speed N1, the reference signal V1 of the preceding cycle has not yet produced at the time the search signal V2 is produced, so that the pin 1 and the pin 7 are connected and a drive signal V4 is not produced, thereby an electrode of point F is a ground electrode. When the speed N of the engine is accelerated and reaches to the rated speen N1, the reference signal V1 and the search signal V2 are superposed on each other and the electrode of the pin 3 becomes higher than that of the pin 3, and also the electrode of the pin 5 becomes higher than that of the pin 6. A drive signal V4 is produced to point F for a time the reference signal V1 and the search signal V2 are superposed on each other. Since the drive signal V4 is produced during a time the reference signal V1 and the search signal V2 are superposed, the more the speed of an engine exceeds the reference speed N1, the longer the drive signal V4 is produced.

The over-revolution preventing device, which is an auxiliary device 6 controlled by the apparatus 1, comprises ① a transistor 16 whose base is connected to point F, an output terminal of the comparator 5 and a point between the positive and the negative terminals of the stabilized power source circuit 2, via a resistance R23, and ② a transistor 17 whose base, a time constant is connected thereto, is connected to an emitter of the transistor 16 and is connected in between a gate cathode of a thyrister 12. When a drive signal V4 is produced from the comparator 5, the transistor 16 is turned on, thereby the transistor 17 is also turned on.

Figure 4:
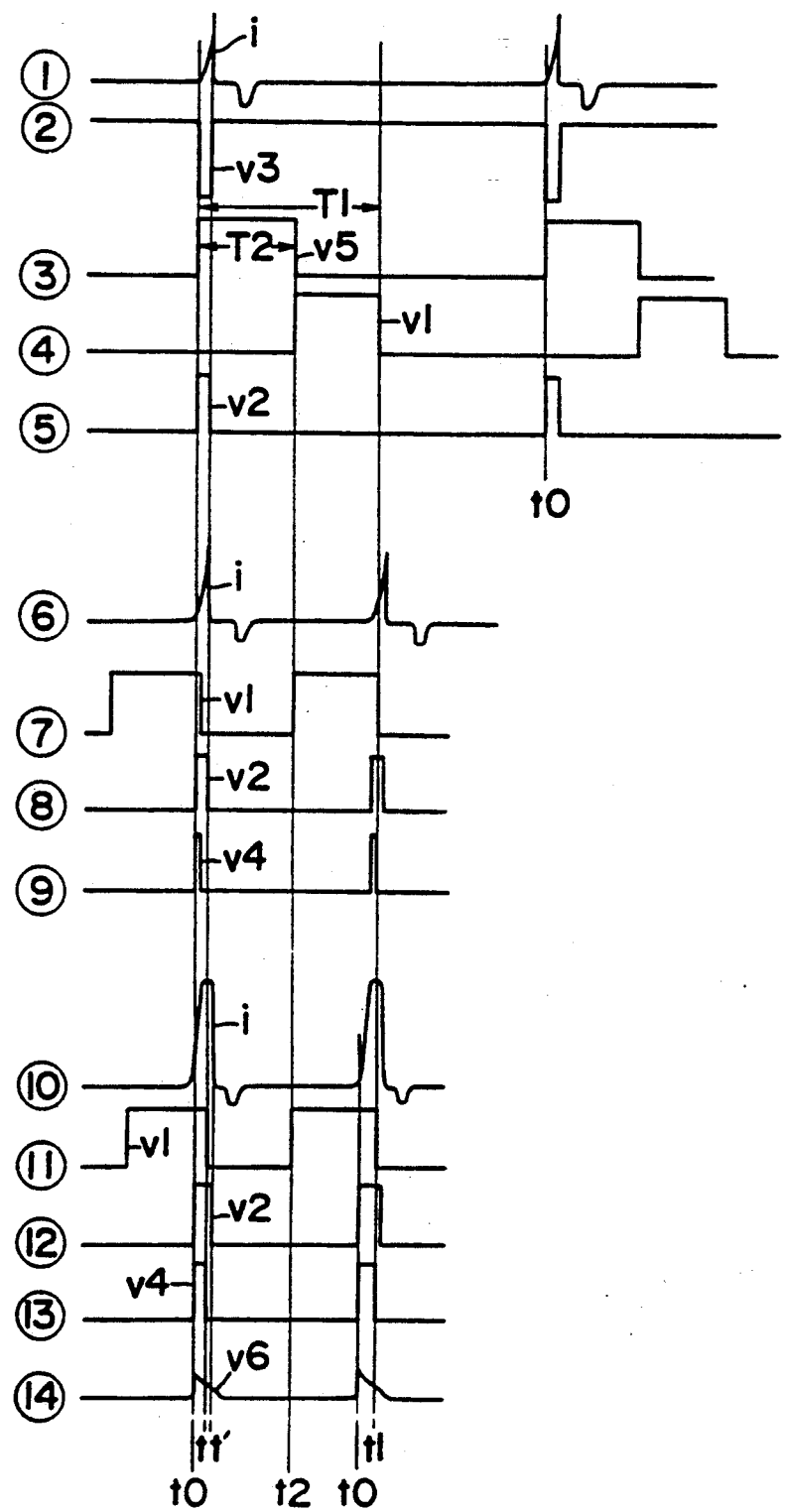
FIG. 4 is a timing chart of each signal produced by each part of the invention shown in FIG. 3.

The turn on of the transistor 17 is being continued during an input time of the drive signal V4 and during a input time of a control signal V6 as shown as 14 in FIG. 4 which is set by a time width of the time constant circuit, and during that time a turn on of the thyrister 12 is terminated, delaying an ignition point t to a point t'. Since the control signal V6 being produced from the over-revolution prevention device is, as stated above, produced during a total time of the time width of the drive signal V4 and the certain time width set by the time constant circuit, its output time is arranged according to a time width of the drive signal V4.

Figure 5:
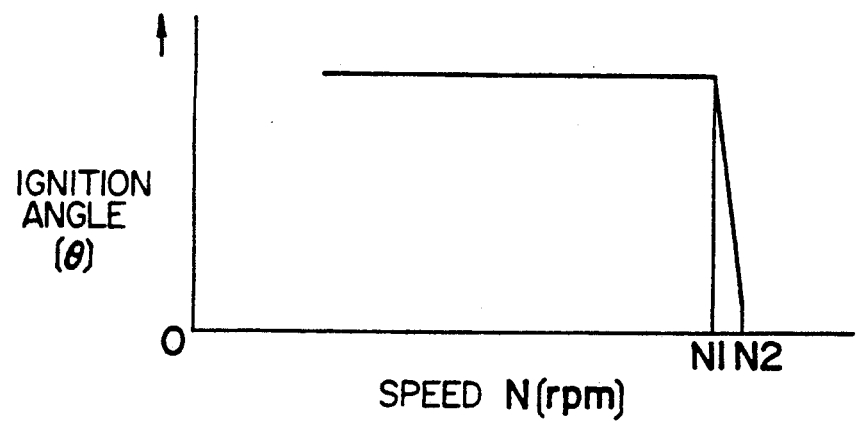
FIG. 5 is a diagram showing a characteristic of a retardation of an ignition point of an ignition device.

When the rate speed N1 is set as a maximum speed and the speed of an engine reaches to this maximum speed, an ignition time t of the ignition circuit 7 is delayed by a control signal V6 produced from the auxiliary device 6 according to a characteristic of an ignition time delay performance shown in FIG. 5, so that the speed of engine is dropped and controlled.

When the speed of the engine largely exceeds the rated speed N1 and reaches to the speed N2, a delayed time of the ignition time t is arranged larger and a transistor 10, a switch for a primary current control, is kept a short circuit, so that the ignition device is turned off and the speed of the engine is immediately dropped and that a safety drive of the engine can be pursued.

By installing a plunger as an auxiliary device 6 to a control device such as a carburetor, a clutch and a brake of an engine to stop their operations, they can be operated smoothly under the rated speed N1. For example, when a rated speed N1 is set to a miximum speed for a safety drive and an auxiliary device 6 comprising a plunger is mounted to a clutch, at a time the speed of the engine exceeds the rated speed N1, the plunger functions, so that a load to the engine is cut off and over reviving of the engine can be prevented.

INDUSTRIAL UTILIZATION OF THE INVENTION

A method and an apparatus according to the present invention is arranged such that a time width of a cycle of a rated speed of an engine is set to a certain amount, and that a difference between the time width of a cycle and the time width of the rated speed is detected, and when the time width of the cycle exceeds the time width of the rated speed, a drive signal is produced for a time according to the time difference between them, so that the engine can be safely driven regardless of the kind and rate of an ignition device and the magnitude of an induced voltage. The magnitude of the induced voltage varies by such as the size of machine upon which an apparatus is mounted. Therefore, an apparatus according to the present invention can be mounted to any internal combustion engine without difficulties.

The time width is detected based on a time width of a cycle of an engine, so that an operation of an apparatus according to the present invention is not affected by an induced voltage, a magnitude thereof varies depending on an engine, and that a setting of a reference time is arranged by a production side prior to an installation of the apparatus. The setting, in the prior art, had to be done by actually driving an engine. As a result, according to the present invention, the reference time can be set accuratetly and the setting of the apparatus to the engine can be easily accomplished.

An impendance of an apparatus according to the present invention can be kept higher, an electric burden affected to an ignition device is minimized, so that it can be mounted to even a small size of an ignition device.

A setting of a rated speed of an engine can be arranged only by a change of a fall point of a reference signal, so that it is easy to change the reference signal and changing the reference signal can be done even at a place the engine is being used.

As stated above, an apparatus according to the present invention can be mounted to any engine regardless its size, rate and an accuracy of an installation, and a same kind of an apparatus can be mounted to any kind of an engine without an adjustment, so that a mass production of a same or a few kind can be possible, leading to an inexpensive price of production.

A stable power source voltage can be produced by a stabilized power source circuit, so that a one-shot multiuibrator circuit and a comparator comprising a integrated circuit can be operated accurately, and that an apparatus according to the present invention can be operated accurately and constantly.

What we claim is:

1. A method for driving an auxiliary device of an internal combustion comprising the steps of:
   setting a time width of one cycle at a rated speed (N1) of an engine as a reference time (T1);
   producing a reference signal (V1) during a time T1-T2, starting from a point (t2), said point (t2) is a fall point of a delay time (T2) started from a rise point (t0) of a primary current (i) of an ignition device of said engine;
   stabilizing said reference signal by providing said reference signal as an output of a multivibrator circuit which is triggered in response to another multivibrator circuit which, in turn, is triggered in response to said primary current;
   producing a search signal (V2) starting from said rise point (t0);
   producing a drive signal (V4) during a time said reference signal (V1) of a preceding cycle and said search signal (V2) of a succeeding cycle are superposed on each other when said reference signal (V1) and said search signal (V2) are produced at the same time; and
   applying said drive signal (V4) as a signal that drives said auxiliary device of said engine.

2. An appartus for driving an auxiliary device of an internal combustion engine comprising:
   a trigger circuit (3), being arranged to produce a trigger signal (V3) affected by a primary current (i) of an ignition device;
   a one-shot multivibrator circuit (4), being arranged to produce a reference signal (V1) by taking said trigger signal (V3) of said trigger circuit (3);
   a comparator (5), being arranged to take said reference signal (V1) of said one-shot multivibrator circuit (4) and a search signal (V2) produced by a rise of said primary current (i) of said ignition device, and to produce a drive signal (V4) to drive an auxiliary device (6), during a time said reference signal (V1) and said search signal (V2) occur simultaneously; and
   a stabilized power source circuit (3), being arranged to charge a reverse voltage induced by said ignition device as a power source of said trigger circuit (3), said one-shot multivibrator circuit (4) and said comparator (5).

3. An apparatus for driving an auxiliary device of an internal combustion engine as claimed in claim 2, comprising a series circuit of a transistor (13) and a first resistance (R8), said transistor (13) comprising a base connected in series with a second resistance on a current path, said first resistance (R8) being connected to a positive electrode of said stabilized power source circuit (2), and a connecting point of said first resistance (R8) and said transistor (13) being arranged to be an output terminal of said trigger signal (V3).

4. An apparatus for driving an auxiliary device of an internal combustion engine as claimed in claim 2, wherein said one-shot multivibrator circuit (4) comprises two one-shot multivibrator circuits, said reference signal (V1) being produced by a succeeding one-shot multivibrator circuit based on a fall point (t2) of a preliminary signal (V5) of a preceding one-shot multivibrator circuit.

5. An apparatus for driving an auxiliary device of an internal combustion engine as claimed in claim 2, wherein said stabilized power source circuit (2) comprises:
   a condenser (C9), being arranged to charge a reverse voltage induced in said ignition device through a diode (23) and a zener diode (24);
   a condenser (C10) for a power source, being arranged to charge a charged power source is said condenser (C9) through a diode (22) and a resistance (R24) reversing its electrode;
   a zener diode (25), being arranged to a reversed position and connected to said condenser (C10) in parallel via a resistance (R25) for reducing a voltage;
   a first transistor (18), an output terminal of a positive side connected to a cathode of said zener diode (25);
   a second transistor (19) for a base control, an output terminal of a negative side connected to a base of said first transistor (18); and
   a third transistor (26) for temperature compensation, being connected to a base of said second transistor (19);
   wherein said first, second and third transistors (18) (19) (26) are rated the same.

6. An apparatus for driving an auxiliary device of an internal combustion engine as claimed in claim 2, wherein said auxiliary device (6) is an over-revolution preventing device, said device being arranged to delay an ignition point (t) for an output time width of a control signal (V6) by said control signal (V6).

7. An apparatus for driving an auxiliary device of an internal combustion engine as claimed in claim 2, wherein said auxiliary device (96) is a plunger device which terminates a control device of an engine.

8. An apparatus as in claim 7, wherein said control device comprises:
   a carburetor, a clutch, and a brake.

* * * * *